United States Patent [19] — Austin
[11] 3,862,631
[45] Jan. 28, 1975

[54] SURGICAL IMPLANTS
[75] Inventor: Roger Tilston Austin, Moseley Birmingham, England
[73] Assignees: Down Bros.; Mayer & Phelps Limited, both of Surrey, England
[22] Filed: May 16, 1973
[21] Appl. No.: 360,932

[52] U.S. Cl. ............................................ 128/92 B
[51] Int. Cl. ............................................. A61f 5/04
[58] Field of Search ............ 128/92 B, 92 A, 92 BB, 128/92 D, 92 R, 83; 85/49

[56] References Cited
UNITED STATES PATENTS

| | | | |
|---|---|---|---|
| 583,455 | 6/1897 | Bush | 128/92 R |
| 2,391,693 | 12/1945 | Ettinger | 128/92 A |
| 2,434,431 | 1/1948 | Pincock | 128/92 A |
| 2,497,626 | 2/1950 | Persall | 128/92 A |
| 3,709,219 | 1/1973 | Halloran | 128/92 A |

Primary Examiner—Richard A. Gaudet
Assistant Examiner—J. Yasko
Attorney, Agent, or Firm—Brisebois & Kruger

[57] ABSTRACT

A surgical implant for use at a site of bone fracture, especially at an osteotomy site, to draw the two parts of bone together and hold them together during healing. The implant is in the form of a staple having two legs to be driven into the bone, one on either side of the fracture. The two legs can be moved towards each other by means of a nut, once they have been driven into the bone.

4 Claims, 4 Drawing Figures

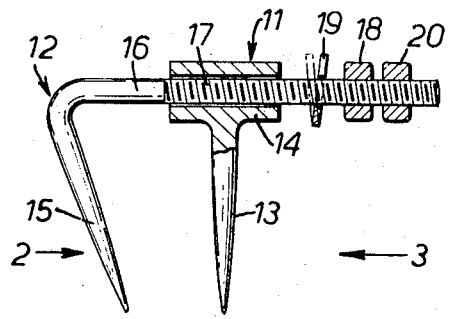
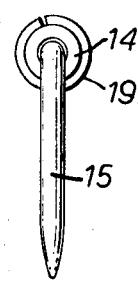
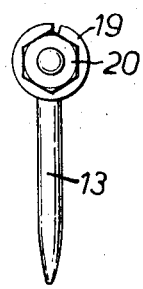
FIG. 1.  FIG. 2.  FIG. 3.
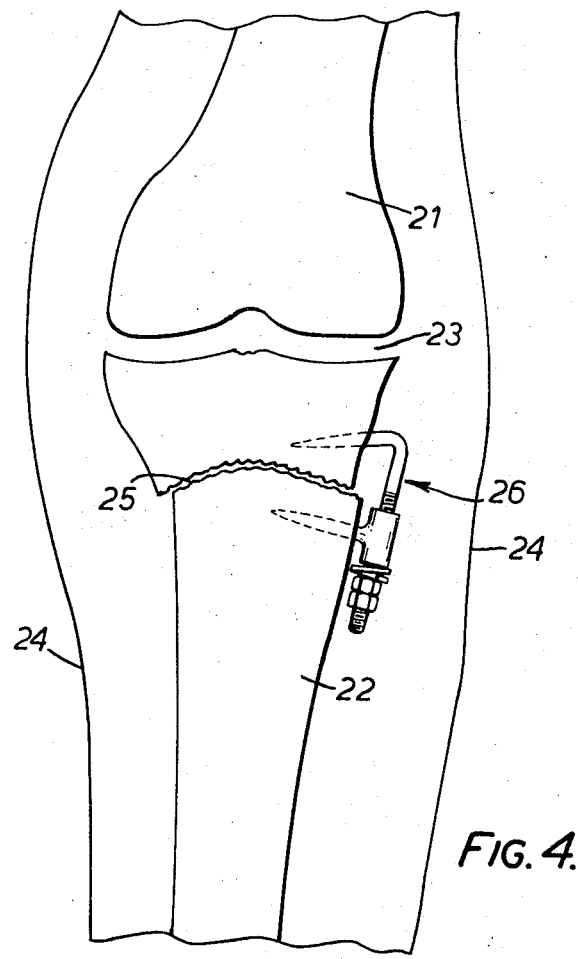
FIG. 4.

SURGICAL IMPLANTS

This invention relates to surgical implants for use at an osteotomy site or at a site of bone fracture.

An osteotomy is a surgically made division of a bone. Such a division may be made, for example, at the end of a long bone in order to correct an angular deformity. The osteotomy and necessary correction having been made, the two parts of the bone then have to be held together in the desired position while the bone heals. Similarly, when a bone has been accidentally broken the two parts of the bone have to be held together while the bone heals.

Two pieces of bone may be held together, for example, by apparatus situated mainly above the skin surface but having needles or pins projecting into or through the bone. Two examples of such apparatus are described in British Pat. Specifications Nos. 347,495 and 377,609.

It is an object of the present invention to provide an apparatus enabling two pieces of bone to be held together to prevent relative movement, which apparatus is an implant and can in use be situated wholly below the skin surface.

It is a further object of the invention to provide an implant which enables the two pieces of bone to be drawn together so as to produce a compression force between them.

Another object of the invention is to provide an implant that can be fitted snugly against the outside of the bone and thus be of little prominence below the skin.

The present invention provides a surgical implant in the form of a staple which comprises two main parts, the first part having an elongated pointed leg for insertion in a bone on one side of a site of fracture and an annular head, and the second part being generally "L-shaped" and having an elongated pointed leg for insertion in the bone on the other side of the site of fracture and a portion that is screw-threaded over at least a part of its length and that can be passed through the annular head of the first part of the staple, the staple additionally comprising a nut capable of being screwed onto the screw-threaded portion so as to hold said first part and said second part together.

In use the two legs of the staple are driven into the bone on opposite sides of the site of fracture and the nut is tightened on the screw thread thus drawing the two legs of the staple, and therefore the two pieces of bone, together. As the nut is tightened still further, compression is applied between the two opposing surfaces on either side of the bone fracture. The term "fracture" as used herein includes fractures made purposely (that is osteotomies) as well as those made accidentally.

The legs of the staple are preferably elliptical in cross-section, with the major axes of the ellipses at corresponding points on two legs being substantially parallel. This means that the force applied to the bone when the staple is in use is spread over a greater area.

Advantageously, the two legs of the staple are inclined one toward the other, because this provides greater stability of the staple in use: as the legs are drawn together by tightening the nut on the screw thread and as compression is thus applied between the two parts of the bone, the legs increase their grip on the bone thus preventing the staple from slipping out of the bone. The desired inclination can most suitably be obtained by arranging for the included angle of the "L-shaped" second part of the staple to be less than 90°, for example, approximately 75°.

The head of the first part of the staple is suitably in the form of a cylindrical collet. The screw-threaded portion of the second part of the staple advantageously carries a spring washer in addition to the nut; this compensates for any slight physiological resorption of the bone ends that may occur during healing. The screw-threaded portion also advantageously carries a second nut to serve as a lock nut to prevent the first nut from loosening while the staple is in use.

The staple is generally made of metals or metal alloys that conform to Bristish Standards for surgical implants.

One or more of the staples can be inserted at an osteotomy site or site of other bone fracture in any position or positions desired by the surgeon. The staples can be arranged so that their protruding parts fit snugly against the outside of the bone thus causing little prominence below the skin.

The invention will now be described in more details, by way of example only, with reference to the accompanying drawings, in which FIG. 1 is a side view, partly in cross-section, of one form of staple in accordance with the invention, FIG. 2 is an end view, in the direction of arrow 2, of the staple shown in FIG. 1, FIG. 3 is an end view in the direction of arrow 3, of the staple shown in FIG. 1, and FIG. 4 is a representation of an X-ray of part of a leg, showing the staple in use.

The staple comprises two parts, the first part being indicated generally by the numeral 11 and the second part by the numeral 12. The first part 11 has an elongated pointed leg portion 13 of elliptical cross-section, the major axis of the ellipse being perpendicular to the plane of FIG. 1 and parallel to the plane of FIG. 3, and a cylindrical collet 14 formed integrally with the leg 13. The second part 12 is generally "L-shaped" and has an elongated pointed leg portion 15 of elliptical cross-section, the major axis of the ellipse being perpendicular to the plane of FIG. 1 and parallel to the plane of FIG. 2, and a portion 16 which is screw-threaded at 17 and passes through the cylindrical collet 14. The included angle between the two portions 15 and 16 of the second part 12 is approximately 75°. The first part 11 and the second part 12 are held together by a nut 18 on the screw thread 17, which also carries a spring washer 19 and a lock nut 20.

The leg shown in the X-ray represented in FIG. 4 has a femur (thigh bone) 21 and a tibia (shin bone) 22; between the two bones is a knee joint space 23. The skin surface is shown at 24. An osteotomy has been carried out on the tibia at 25 and the two parts of the bone have been moved relative to each other to effect an angular correction. The two legs of the staple, shown generally at 26, have been driven into the bone, one on either side of the osteotomy 25. The nut 18 has been tightened to draw together the two legs and thus the two parts of the bone, and the lock nut 20 has been tightened against the nut 18. The parts of the staple protruding from the bone fit snugly against the bone surface.

I claim:

1. A surgical implant in the form of a staple having only two main leg-carrying parts, the first part having a single elongated substantially straight pointed leg for insertion in a bone on one side of a site of fracture and an annular head in the form of a cylindrical collect, and the second part being generally "L-shaped" and having a single elongated substantially straight pointed leg for insertion in the bone on the other side of the site of fracture and a portion that is screw-threaded over at least a part of its length and is passed through the annular head of the first part of the staple, at least one of said legs being inclined one towards the other and the staple additionally comprising a nut screwed onto the screw-threaded portion so as to hold said first part and said second part together by means of which nut said first part and said second part can be moved relative to one another after insertion of the staple into the bone, so as to draw the two parts of the bone together.

2. A surgical implant according to claim 1, wherein the legs of the staple are elliptical in cross-section with the major axes of the ellipses at corresponding points on the two legs being substantially parallel.

3. A surgical implant according to claim 1, wherein the included angle of the "L-shaped" second part is less than 90°.

4. A surgical implant according to claim 3, wherein said included angle is approximately 75°.

* * * * *